Jan. 10, 1933. C. G. KELLER 1,893,947
VEHICLE WHEEL
Filed May 14, 1931
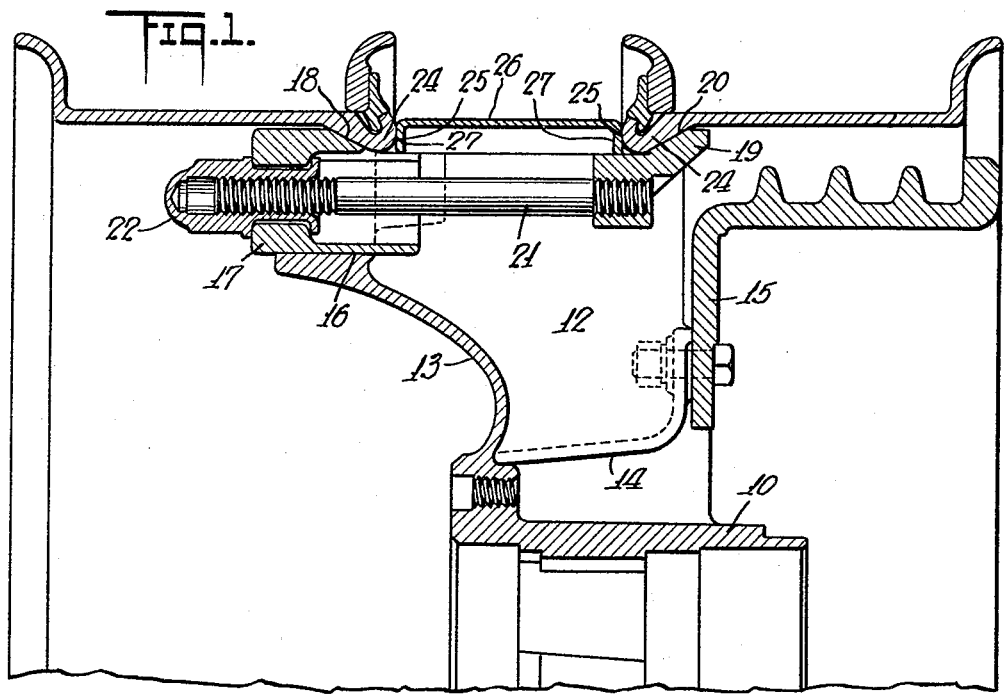
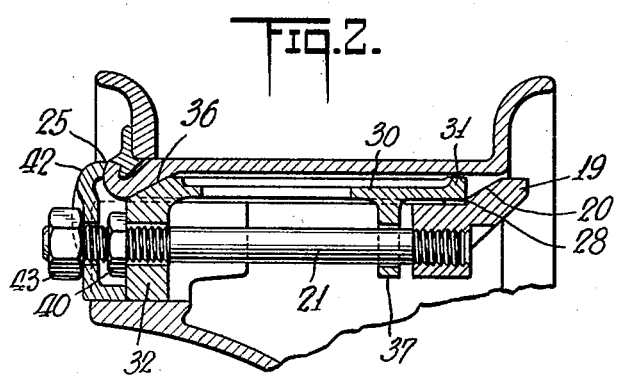
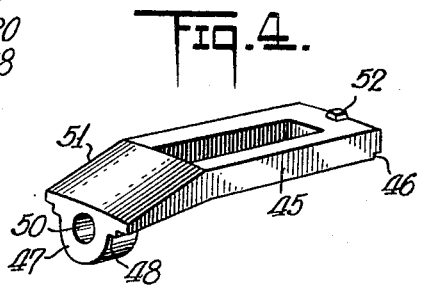
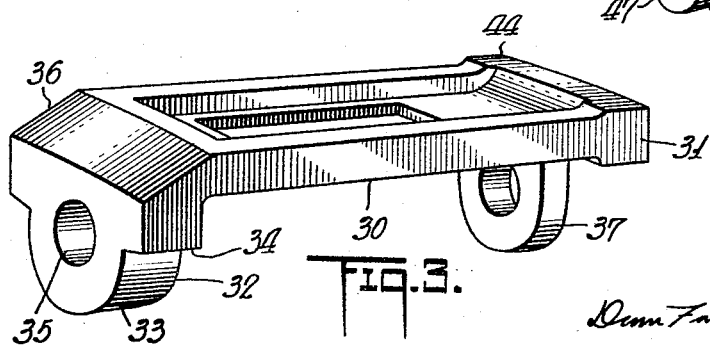
INVENTOR
*Charles G. Keller*
BY
ATTORNEYS

Patented Jan. 10, 1933

1,893,947

UNITED STATES PATENT OFFICE

CHARLES G. KELLER, OF HYDE PARK, NEW YORK

VEHICLE WHEEL

Application filed May 14, 1931. Serial No. 537,362.

The present invention relates to vehicle wheel constructions, and is a continuation in part of co-pending application Serial No. 352,625, filed April 5, 1929 on which was granted Patent No. 1,827,793, issued October 20, 1931. In that patent, there is described and claimed a fellyless vehicle wheel adapted to carry a pair of removable tire carrying rims secured in place by clamping members at a plurality of points spaced circumferentially of the wheel. The clamping members present seats for the inboard portion of the outboard rim, and are movable axially to force the outboard rim axially against a spacing member, and to force the latter axially to press the inboard rim onto seats for the outboard portion thereof. Thus the rims are supported in axially spaced positions, the inboard rim being supported only adjacent to its outboard side, and the outboard rim being supported only adjacent to its inboard side.

One object of the present invention is to provide an adapter for use in mounting a single rim in a centrally disposed position on a wheel primarily adapted for dual rims.

Another object of the present invention is to provide means whereby said centrally disposed rim will be subjected to equal clamping action at spaced points along the periphery thereof and secured in position in a plane at right angles to the axis of the wheel.

In the accompanying drawing, there are shown for purposes of illustration, two embodiments of the invention, in which drawing Fig. 1 is a section in a radial longitudinal plane through a portion of a wheel showing a pair of rims clamped thereon.

Fig. 2 is a section through the same wheel, but with a single centrally mounted rim carried by an adapter in accordance with my invention.

Fig. 3 is a perspective view of the adapter shown in Fig. 2, and

Fig. 4 is a perspective view of another form of adapter.

In Fig. 1, there is shown a type of wheel which is particularly adapted for use in conjunction with my present invention, and certain features of which are illustrated in greater detail and claimed in my co-pending application Serial No. 182,199, filed April 9, 1927, and in other co-pending applications.

In the construction here shown, the body of the wheel is of spider or fellyless type and is provided with a hub 10 and a series of spokes cast integral therewith. Each spoke is substantially U-shaped in cross-section and has side walls 12 open at the inboard side, and a connecting wall 13 on the outboard side. Between adjacent spokes is a web 14 to which a brake drum 15 may be secured. Each spoke at its outer end has an axially extending, approximately semi-cylindrical guideway or groove 16 at the outboard side within which is slidably mounted a rim clamping member 17 presenting an inclined surface or rim seat 18 for supporting one rim. Each spoke at its radially outer end, has a transverse wall or bridge piece 19 at the inboard side presenting an inclined surface or rim seat 20 for supporting another rim. The wall or bridge piece 19 carries a bolt or stud 21 which extends parallel to the axis of the wheel, through the groove or guideway 16, and through the clamping member 17. A nut 22 at the other end of this bolt 21 serves to force the clamping member 17 in an inboard direction to bring the inclined surfaces 18 and 20 toward or away from each other.

Two standard rims of the single bevel type are employed, each having an inwardly extending projection 24 presenting an axially facing shoulder 25 and an inclined surface. One rim is seated with its inclined surface on the corresponding inclined surface of the rim support 19 and the other is in reverse position and on the inclined surface 18 of the other rim support comprising the clamping member 17.

The two rims are held apart by an annular spacing member 26, preferably provided with side flanges 27 arranged to abut against the shoulders 25 of the rims.

The annular rim seats 18 and 20 are shown as being interrupted in that they are made up of sections on the ends of separate spokes, and are so positioned in respect to the axis of the wheel and the diameter of the projections 24 on the rims that when the rims are forced axially to such distances that they are effectively clamped in place, the rims are slightly distorted and efficient clamping action results.

In carrying out the present invention, an adapter is used for securing a single rim in a centrally disposed position on a wheel of the general type shown in Fig. 1. The adapter shown in Figs. 2 and 3 includes a plate or bar 30 having an end portion 31 adapted to engage a shoulder 28 on the bridge piece 19. The other end of the adapter is provided with a lug 32 having a curved surface 33 which is movable lengthwise of the semi-cylindrical guideway or groove 16. This lug 32 is provided with shoulders 34 extending beyond the outer periphery of the walls bounding the groove 16, and is also provided with a hole 35 which embraces the bolt 21, and which is large enough to permit the slidable movement of the adapter therealong. The shoulders 34 may seat on the wall of the recess, or the curved side of the lug 32 may seat in the recess, or seating may be at both places to support the outboard end of the adapter. The adapter at the outboard end presents a rim seat 36 which lies parallel to and axially spaced from the rim seat 20 when mounted in position, and at the inboard end has a radially inwardly extending lug 37 which also has a hole to receive the bolt 21, and hold said adapter in a position parallel to the axis of the wheel.

The several adapters are slid on to the bolts 21 and locked in position against the shoulders 28 by nuts 40 on the bolts, said nuts abutting against the lugs 32. For forcing the rim on to the seats 36, the clamping members 42 are employed which have surfaces for engaging both the end of the adapter and the shoulder 25 of the rim. These clamping members 42 have walls on the radially inward ends thereof and side walls extending radially outwardly therefrom, all of these walls forming a chamber to receive the nuts 40. The members 42 are forced and held in position by nuts 43 engaging the ends of the bolts 21.

When in clamped position, the shoulder 25 of the rim projects toward the outboard side beyond the outboard end of the adapter. Under the action of the clamping members 42, the rim can be forced axially by the tilting of the clamping members until the radially inward walls and side walls of said members flatly abut the outboard end of the adapter, thereby forcing and clamping the rim to predetermined limiting position. Each member 42 may be moved into final position independently of the movement of the others, the rim being given a predetermined draw with corresponding distortion or flattening between adjacent spokes. If desired, the inboard end of the adapter may be provided with a projection 44 for engaging the inner periphery of the rim to form a guiding support during the initial axial sliding of the rim in place.

In Fig. 4 is shown a slightly different form of adapter consisting of a plate or bar 45, the inboard end of which is provided with a shoulder 46 for engaging the shoulder 28. The outboard end of this adapter is provided with a lug 47 having a cylindrical surface similar to the surface 33 of Fig. 3, and having shoulders 48 extending substantially parallel to the axis of the bore 50, whereby said shoulder may extend beyond and rest on the outer periphery of the walls which bound the guide groove 16. This adapter is also provided with a rim seat 51 at its outboard end, which lies parallel to and axially spaced from the rim seat 20 when mounted in position. A radially outwardly extending lug 52 is also provided, which serves the same purpose as the projection 44 of Fig. 3.

Thus with the same wheel construction, I may mount two rims in axially spaced relationship, or may mount a single rim in a central position, all of these arrangements retaining the rim or rims in firmly clamped position.

Having thus described my invention, what I claim as new and desire to secure by Letters Patent is:—

1. A fellyless wheel body adapted to support a pair of axially spaced rims, with each acting as a part of means for holding the other against axial movement, and each having an internal beveled surface, said body including a plurality of spokes, each of which presents an inclined rim seat adjacent to the inboard side near the outer periphery thereof and a shoulder, the seats being in position to support one of said pair of rims with the beveled surface of said rim in engagement with said seats, a plurality of detachable members one carried by each of said spokes and each having a rim seat at the outboard side, said last mentioned rim seat being substantially parallel to said first mentioned rim seat of the corresponding spoke and axially spaced therefrom, said seats on said members being adapted to support a single rim similar to one of said pair of rims, means for clamping said members in predetermined positions and against said shoulders, and means engaging said single rim for forcing said single rim axially into clamped position on said seats of said detachable members.

2. A vehicle wheel body normally adapted for carrying a pair of axially spaced rims, said wheel body having a rigid inclined seat for one rim, and having a recess adapted to receive a movable rim seat for a second rim, a bolt extending in a direction substantially parallel to the axis of the wheel body and through said recess, and secured to the wheel body adjacent to said first mentioned seat, an adapter for supporting a centrally disposed rim, and having a portion for engaging said wheel body near said first mentioned seat, and a portion presenting a rim seat disposed substantially parallel to and spaced axially from said first mentioned seat, and means on the bolt for rigidly securing said adapter in position.

3. A vehicle wheel body normally adapted for carrying a pair of axially spaced rims, and having a rigid inclined seat for supporting one of said rims, and having a recess adapted to receive a movable seat member for a second of said rims, a bolt extending in a direction substantially parallel to the axis of the wheel body, and passing through said recess, said bolt being secured to the wheel body adjacent to said first mentioned seat, and means for centrally supporting said single rim on the wheel body, said means including an adapter having a portion for engaging said wheel body near said first mentioned seat, and a portion presenting a seat substantially parallel to and spaced axially from said first mentioned seat, means on the bolt for rigidly securing said adapter in position, a lug encircling said bolt and adapted to engage said single rim, and a nut threaded on said bolt and engaging said lug for forcing said single rim on the seat of said adapter.

4. An adapter for use in securing a rim in centrally disposed position on a vehicle wheel body adapted for dual rims, said adapter including a member having a portion for abutting engagement with the wheel body, a rim seat on said adapter, and a retaining lug on the radial inward side of said adapter, the radially inward side of the lug being convexly curved to slide on a correspondingly shaped seat on the wheel body.

5. A vehicle wheel structure including a wheel body adapted to support a pair of axially spaced rims, and having a plurality of recesses circumferentially spaced near the outer periphery of said wheel body, each of said recesses having curved bases, a detachable member supported at one end in each of said recesses, and having the opposite end engaging the wheel body to limit the axial movement of said member in an inboard direction, the portion of said member supported in the recess being curved to conform with the curvature of the bases of said recesses, means for clamping said detachable member to said vehicle body, said detachable member having an inclined rim supporting seat, a rim having an internal beveled surface engaging said seat, and means for forcing said rim axially on said seat to clamp said rim in position.

6. A wheel structure having a beveled seating surface on the inboard edge of the periphery thereof and a seating surface on the outboard edge of the periphery, a rim having an internal beveled seating surface facing in the opposite direction axially from that of the seating surface on said inboard edge, and adapted to seat thereon to sustain the load, and with the portion of the rim extending axially inwardly from said internal beveled seating surface overhanging the said seating surface at the inboard edge, said rim being substantially centered on the wheel structure supporting the load through the internal beveled seating surface on the rim and the seating surface on the outboard edge of the peripheral face of the wheel structure, spacing means interposed between the internal beveled seat on the rim and the seating surface on the outboard edge of the wheel structure and extending transversely of the periphery of the wheel structure and engaging said wheel structure at a point adjacent said first mentioned seat to limit inboard axial movement of said spacing means and clamping means for securing the rim and wheel structure in central position.

7. A wheel structure having a beveled seating surface on the inboard edge of the periphery thereof, and a seating surface on the outboard edge of the periphery, a rim having an internal beveled seating surface facing in the opposite direction axially from that of the seating surface on the said inboard edge, and adapted to seat thereon to sustain the load, with the portions of the rim extending axially inwardly from said internal beveled seating surface overhanging the said seating surface at the inboard edge, said rim being substantially centered on the wheel structure supporting the load through the internal beveled seating surface on the rim, and the seating surface on the outboard edge of the peripheral face of the wheel structure, a spacing member interposed between the internal beveled seat on the rim and the seating surface on the outboard edge of the wheel structure, means for clamping said spacing member in predetermined position on and in axial abutting engagement with said wheel structure, and means operable independently of said first mentioned means for forcing said rim axially into clamped position on said spacing member.

8. In combination with a wheel body adapted to support a pair of axially spaced rims, means for securing a single rim in a centrally disposed position on said wheel body, and including an adapter having an end portion abutting said wheel body, a radially outwardly facing rim seat adjacent to the other end of said adapter, said seat being inclined radially inwardly towards said last mentioned end, and a retaining lug extending from the radially inward face of said adapter.

9. In combination with a wheel body adapted to normally support a pair of axially spaced rims, means for securing a single rim in a centrally disposed position on said wheel body, and including an adapter having an end portion abutting said wheel body, a radially outwardly facing rim seat adjacent to the other end of said adapter, said seat being inclined radially inwardly towards said last mentioned end, and a pair of retaining lugs on the radially inward side of said adapter and spaced apart lengthwise of the adapter.

10. An adapter for use in securing a rim in a centrally disposed position on a wheel body adapted for dual rims, said adapter having an end portion adapted to abut the wheel body, a rim seat at one end of said adapter, and a retaining lug on the radially inward side of said adapter near the other end thereof, said lug being spaced from said latter end.

11. An adapter for use in securing a rim in a centrally disposed position on a vehicle wheel body adapted for dual rims, said adapter having an end portion adapted to abut said wheel body, a radially outwardly facing rim seat adjacent to the other end of said adapter, said seat being inclined radially inwardly towards said last mentioned end, and a pair of retaining lugs on the radially inward side of said adapter, and spaced apart lengthwise of the adapter, one of said retaining lugs being disposed at one end near the rim seat, and being convexly curved to slide on a correspondingly shaped seat on the wheel body, the other retaining lug being spaced from the other end of said adapter.

Signed at Newark in the county of Essex and State of New Jersey, this 31st day of March, 1931.

CHARLES G. KELLER.